(12) United States Patent
Zhang

(10) Patent No.: US 11,023,034 B2
(45) Date of Patent: Jun. 1, 2021

(54) METHOD AND APPARATUS FOR MULTIUSER INTERACTION AND ACCOMPANYING ROBOT

(71) Applicant: SHENZHEN ROYOLE TECHNOLOGIES CO. LTD., Guangdong (CN)

(72) Inventor: Xuan Zhang, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 16/304,655

(22) PCT Filed: Jun. 16, 2016

(86) PCT No.: PCT/CN2016/086073
§ 371 (c)(1),
(2) Date: Nov. 26, 2018

(87) PCT Pub. No.: WO2017/214947
PCT Pub. Date: Dec. 21, 2017

(65) Prior Publication Data
US 2020/0327634 A1    Oct. 15, 2020

(51) Int. Cl.
*G06F 3/01* (2006.01)
*G06F 3/048* (2013.01)

(52) U.S. Cl.
CPC ............ *G06F 3/011* (2013.01); *G06F 3/048* (2013.01); *G06F 2203/04803* (2013.01)

(58) Field of Classification Search
CPC . G06F 3/005; G06F 3/01; G06F 3/011; G06F 3/012; G06F 3/017; G06F 2203/0382; G06F 2203/04803; G06F 3/048
See application file for complete search history.

(56) References Cited

U.S. PATENT DOCUMENTS 9,274,605 B2 * 3/2016 Noda ................ G06F 3/011
9,317,899 B2 * 4/2016 Sakai ................ G09G 5/00
(Continued)

FOREIGN PATENT DOCUMENTS

CN    1435765 A    8/2003
CN    103365620 A    10/2013
(Continued)

OTHER PUBLICATIONS

"Development of Robot System with Cylindrical Multi-touch Display", Yuya Morimoto, Akihisa Ohya, University of Tsukuba, Proceeding of the 2011 JSME Conference on Robotics and Mechatronics, May 26, 2011, pp. 1682-1685.
(Continued)

*Primary Examiner* — Gene W Lee
(74) *Attorney, Agent, or Firm* — Hauptman Ham, LLP

(57) ABSTRACT

A method for multiuser interaction includes: detecting the number of users of an accompanying robot and azimuths of the users relative to the accompanying robot; dividing a display screen of the accompanying robot into a plurality of screen splitting display areas according to the number and azimuths of the users; and interacting the users located at the different azimuths with the accompanying robot simultaneously by the plurality of screen splitting display areas. The method for multiuser interaction may be operated to realize synchronous interaction between the accompanying robot and the plurality of users, reduce the power consumption and production cost of the accompanying robot, and improve the overall performance of the accompanying robot. An apparatus for multiuser interaction and an accompanying robot are provided by the present disclosure.

20 Claims, 7 Drawing Sheets

(56) References Cited

U.S. PATENT DOCUMENTS

| | | | | |
|---|---|---|---|---|
| 9,372,540 | B2* | 6/2016 | Park | G06F 3/017 |
| 9,442,561 | B2* | 9/2016 | Itoh | G06F 3/013 |
| 9,667,952 | B2* | 5/2017 | Itoh | G06F 3/013 |
| 9,791,934 | B2* | 10/2017 | Itoh | H04N 13/204 |
| 10,216,356 | B2* | 2/2019 | Noda | G06F 3/017 |
| 10,289,085 | B2* | 5/2019 | Jeong | F16M 11/08 |
| 10,360,876 | B1* | 7/2019 | Rahman | G06F 3/1423 |
| 2011/0032274 | A1* | 2/2011 | Miyata | G06F 3/0481 345/660 |
| 2012/0304093 | A1 | 11/2012 | Magnusson et al. | |
| 2013/0194238 | A1* | 8/2013 | Sakai | H04N 21/4223 345/175 |
| 2014/0354695 | A1* | 12/2014 | Sakai | G06F 3/0485 345/650 |
| 2017/0293272 | A1* | 10/2017 | Jeong | H02P 31/00 |

FOREIGN PATENT DOCUMENTS

| | | |
|---|---|---|
| CN | 104765905 A | 7/2015 |
| JP | 2010157115 A | 7/2010 |
| JP | 2015041271 A | 3/2015 |
| JP | 2016045784 A | 4/2016 |

OTHER PUBLICATIONS

International search report dated Mar. 23, 2017 from corresponding application No. PCT/CN2016/086073.

Hrvoje Benko et al:"Sphere", Proceedings of the 21st Annual ACM Symposium on User Iterface Software and Technology, UIST'08, Oct. 19-22, 2008, Monterey, California, USA, ACM Press, New York, New York, USA, Oct. 19, 2008 (Oct. 19, 2008), pp. 77-86, XP058231337, DOI: 10.1145/1449715.1449729 ISBN: 978-1-59593-975-3.

* cited by examiner

METHOD AND APPARATUS FOR MULTIUSER INTERACTION AND ACCOMPANYING ROBOT

RELATED APPLICATIONS

The present application is a National Phase of International Application Number PCT/CN2016/086073, filed Jun. 16, 2016.

TECHNICAL FIELD

The application relates to the field of human computer interaction, more particularly relates to a method for multiuser interaction, an apparatus for multiuser interaction and an accompanying robot.

BACKGROUND

With the constantly intellectualization of home appliances, demands of smart services of consumers are increasing. In recent years, robots are applied from an industrial field to the fields of home services, medical rehabilitation, education, entertainment and the like. In order to provide the consumers with smarter and more convenient life experience, various accompanying robots have emerged in the market. Some information is interacted between the accompanying robot and the user by a display screen. For example, a touch display screen, which can receive the information inputted by the user and display the corresponding output information, is arranged on a head portion or a body of the accompanying robot, thus realizing the information interaction. However, in the interactive mode, the accompanying robot can only interact with a single user at the same time. When a plurality of users operate the accompanying robot simultaneously, the accompanying robot is rotated or partially rotated to drive the touch display screen to face towards corresponding users. Plenty of electrical energy is consumed by driving the robot to rotate. When the robot applied the partial rotation mode, such as a head rotation mode, a rotating mechanism needs to be arranged on the robot. Thus, as the time and frequency of use increase, the rotating mechanism would wear down, and thereby cause the accompanying robot breakdown and reduce the whole performance of the accompanying robot.

SUMMARY

In view of the above problems in the related art, exemplary embodiments of the present disclosure provide a method for multiuser interaction, an apparatus for multiuser interaction, and an accompanying robot, thus realizing synchronous interaction between the accompanying robot and a plurality of users, reducing the power consumption and production cost of the accompanying robot, and improving the whole performance of the accompanying robot.

A method for multiuser interaction, includes:
detecting the number of users of an accompanying robot and azimuths of the users relative to the accompanying robot;
dividing a display screen of the accompanying robot into a plurality of screen splitting display areas according to the number and azimuths of the users; and
interacting the users located at the different azimuths with the accompanying robot simultaneously by the plurality of screen splitting display areas.

In an alternative exemplary embodiment, the dividing a display screen of the accompanying robot into a plurality of screen splitting display areas according to the number and azimuths of the users, includes:
calculating the number of first screen splitting display areas divided in a first direction according to the number of the azimuths;
calculating a position and a size of the first screen splitting display area corresponding to each of the azimuths according to a preset viewing angle; and
dividing the display screen in the first direction into a plurality of first screen splitting display areas corresponding to the number of the azimuths.

In an alternative exemplary embodiment, dividing a display screen of the accompanying robot into a plurality of screen splitting display areas according to the number and azimuths of the users, further includes:
calculating the number of second screen splitting display areas divided in a second direction according to the number of the users at each of the azimuths; and
dividing the first screen splitting display area corresponding to each of the azimuths in the second direction into a plurality of second screen splitting display areas corresponding to the number of the users of each of the azimuths.

In an alternative exemplary embodiment, after dividing a display screen of the accompanying robot into a plurality of screen splitting display areas according to the number and azimuths of the users, and before interacting the users located at the different azimuths with the accompanying robot simultaneously by the plurality of screen splitting display areas, the method further includes:
detecting postures of the users relative to the accompanying robot; and
controlling the screen splitting display areas to adjust display directions thereof according to the postures of the users relative to the accompanying robot.

In an alternative exemplary embodiment, the interacting the users located at the different azimuths with the accompanying robot simultaneously by the plurality of screen splitting display areas, includes:
receiving respectively input information of different users by each of the screen splitting display areas;
processing independently the input information of each of the users; and
displaying respectively the input information for the different users by the plurality of the screen splitting display areas.

An apparatus for multiuser interaction, includes:
a detecting unit being operable to detect the number of users of an accompanying robot and azimuths of the users relative to an accompanying robot;
a screen splitting unit being operable to divide a display screen of the accompanying robot into a plurality of screen splitting display areas according to the number and azimuths of the users; and
an interacting unit being operable to interact with the users located at the different azimuths simultaneously by the plurality of screen splitting display areas.

In an alternative exemplary embodiment, the screen splitting unit includes: a number determining subunit being operable to calculate the number of first screen splitting display areas divided in a first direction according to the number of the azimuths;
a position determining subunit being operable to calculate a position and a size of the first screen splitting display area corresponding to each of the azimuths according to a preset viewing angle; and a screen splitting processing subunit being operable to divide the display screen in the first direction into a plurality of first screen splitting display areas corresponding to the number of the azimuths.

In an alternative exemplary embodiment, the number determining subunit is further being operable to calculate the number of second screen splitting display areas divided in a second direction according to the number of the users at each of the azimuths;

the screen splitting processing subunit is further operable to divide the first screen splitting display area corresponding to each of the azimuths in the second direction into a plurality of second screen splitting display areas corresponding to the number of the users of each of the azimuths.

In an alternative exemplary embodiment, the detecting unit is further operable to detect postures of the users relative to the accompanying robot; and the screen splitting unit is further operable to control the screen splitting display areas to adjust display directions according to the postures of the users relative to the accompanying robot.

In an alternative exemplary embodiment, the interacting unit includes:
an input subunit being operable to receive respectively input information of the different users by each of the screen splitting display areas;
a processing subunit being operable to process the input information of each of the users independently; and
an output subunit being operable to display the input information for the different users by the plurality of the screen splitting display areas.

An accompanying robot, includes a main body and a head portion, the accompanying robot further includes a processor, a memory, a display screen, and a plurality of sensors; the display screen and the plurality of sensors surround the main body or the head portion; the processor is electrically connected with the memory, the display screen and the plurality of sensors, the processor is operable to call an executable program code stored in the memory, and perform the following operations:

detecting the number of users of an accompanying robot and azimuths of the users relative to the accompanying robot;
dividing a display screen of the accompanying robot into a plurality of screen splitting display areas according to the number and azimuths of the users; and
interacting the users located at the different azimuths with the accompanying robot simultaneously by the plurality of screen splitting display areas.

In an alternative exemplary embodiment, dividing a display screen of the accompanying robot into a plurality of screen splitting display areas according to the number and azimuths of the users, includes:
calculating the number of the first screen splitting display areas divided in a first direction according to the number of the azimuths;
calculating a position and a size of the first screen splitting display area corresponding to each of the azimuths according to a preset viewing angle; and
dividing the display screen in the first direction into a plurality of first screen splitting display areas corresponding to the number of the azimuths.

In an alternative exemplary embodiment, dividing a display screen of the accompanying robot into a plurality of screen splitting display areas according to the number and azimuths of the users, further includes:
calculating the number of the second screen splitting display areas divided in a second direction according to the number of the users at each of the azimuths; and dividing the first screen splitting display area corresponding to each of the azimuths in the second direction into a plurality of second screen splitting display areas corresponding to the number of the users of each of the azimuths.

In an alternative exemplary embodiment, after dividing a display screen of the accompanying robot into a plurality of screen splitting display areas according to the number and azimuths of the users, and before interacting the users located at the different azimuths with the accompanying robot simultaneously by the plurality of screen splitting display areas, the method further includes:
detecting postures of the users relative to the accompanying robot; and
controlling the screen splitting display areas to adjust display directions thereof according to the postures of the users relative to the accompanying robot.

In an alternative exemplary embodiment, interacting the users located at the different azimuths with the accompanying robot simultaneously by the plurality of screen splitting display areas, includes:
receiving respectively input information of the different users by each of the screen splitting display areas;
processing independently the input information of each of the users; and
displaying respectively the input information for the different users by the plurality of the screen splitting display areas.

The method and apparatus for multiuser interaction and the accompanying robot are provided by the present disclosure. The method for multiuser interaction includes detecting the number of users of the accompanying robot and the azimuth of the user relative to the accompanying robot, and dividing the display screen of the accompanying robot into a plurality of screen splitting display areas, thereby interacting the users located at the different azimuths with the accompanying robot simultaneously by the plurality of screen splitting display areas, and thereby realizing synchronous interaction between the accompanying robot and the plurality of users, reducing the power consumption and production cost of the accompanying robot, and improving the whole performance of the accompanying robot.

BRIEF DESCRIPTION OF THE DRAWINGS

In order to more clearly illustrate the technical solution in the exemplary embodiments of the present disclosure, the accompanying drawings used in the description of the exemplary embodiments will be briefly described below.

DETAILED DESCRIPTION

The technical solutions in the embodiments of the present disclosure are clearly and completely described below with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
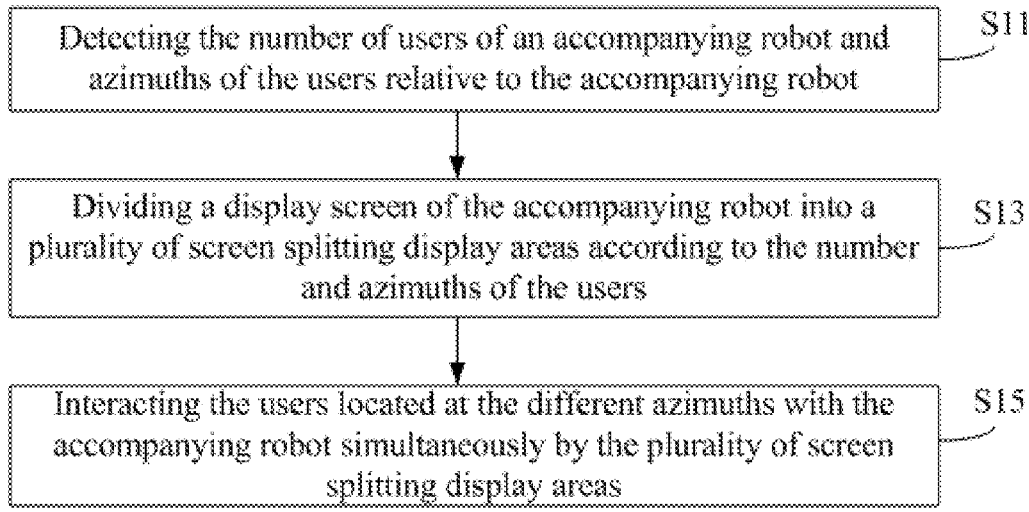
FIG. 1 is a first schematic flowchart of a method for multiuser interaction provided by a first exemplary embodiment of the present disclosure.

As illustrated FIG. 1, in an exemplary embodiment of the present disclosure, a method for multiuser interaction is provided for applying to an accompanying robot, thus realizing synchronous interaction between the accompanying robot and a plurality of users, reducing the power consumption and production cost of the accompanying robot, and improving the whole performance of the accompanying robot.

The method for multiuser interaction includes the following operations.

At block S11, the number of users of an accompanying robot and azimuths of the users relative to the accompanying robot are detected by the accompanying robot.

At block S13, a display screen of the accompanying robot is divided into a plurality of screen splitting display areas by the accompanying robot according to the number and azimuths of the users.

At block S15, the accompanying robot is interacted with the users located at the different azimuths simultaneously by the plurality of screen splitting display areas.

In detail, the accompanying robot includes a main body, a head portion, a display screen surrounding the main body or the head portion, and a plurality of sensors. The display screen is operated to interact with the users. In the embodiment, the display screen is a flexible touching display screen, which may receive input information of the users and display corresponding output information. The sensors are operated to detect the number of users of an accompanying robot and azimuths of the users relative to the accompanying robot. It will be apprehended that, the plurality of sensors may be arranged at equal intervals around the main body or the head portion according to a preset azimuth, and may be located on a same horizontal plane, thus the number of the users located in different azimuths of the accompanying robot may be detected, and the number of users at all of the azimuths may be counted.

In the embodiment, the sensor may be an image sensor. Each of the image sensors corresponds to one azimuth, and the azimuths corresponding to the two adjacent image sensors are seamlessly connected, i.e., no blind angle is represented between capturing areas of two adjacent image sensors. Thus a panoramic image around the accompanying robot may be acquired by the plurality of image sensors, and thereby the number of the users at each of the azimuths and all the number of the users may be acquired by processing the panoramic image. The azimuth corresponding to each of the image sensors corresponds to a direction and a range covered by a maximum imaging angle of each of the image sensors. For example, the maximum imaging angle of one of the image sensors is assumed as 90 degrees, four image sensors are arranged at a pitch of 90 degrees on the main body or the head portion of the accompanying robot, thus covering all the azimuths of the accompanying robot.

The accompanying robot further includes a processor and a memory. The processor is electrically connected with the memory, the display screen, and the plurality of sensors. The processor is operated to divide the display screen of the accompanying robot into a plurality of screen splitting display areas according to the number of the users and the azimuths detected by the plurality of the sensors, process input information of the users to generate the corresponding output information, and control the plurality of screen splitting display areas to display the output information, respectively. In the embodiment, the input information of the different users is respectively received by different screen splitting display areas, and the input information of each of the users is processed by the processor individually, thus the output information is displayed for the different users by the plurality of screen splitting display areas, respectively. The memory is operated to store system data and user data, such as an operating system and a running program of the accompany robot, or user-defined parameters.

Figure 2:
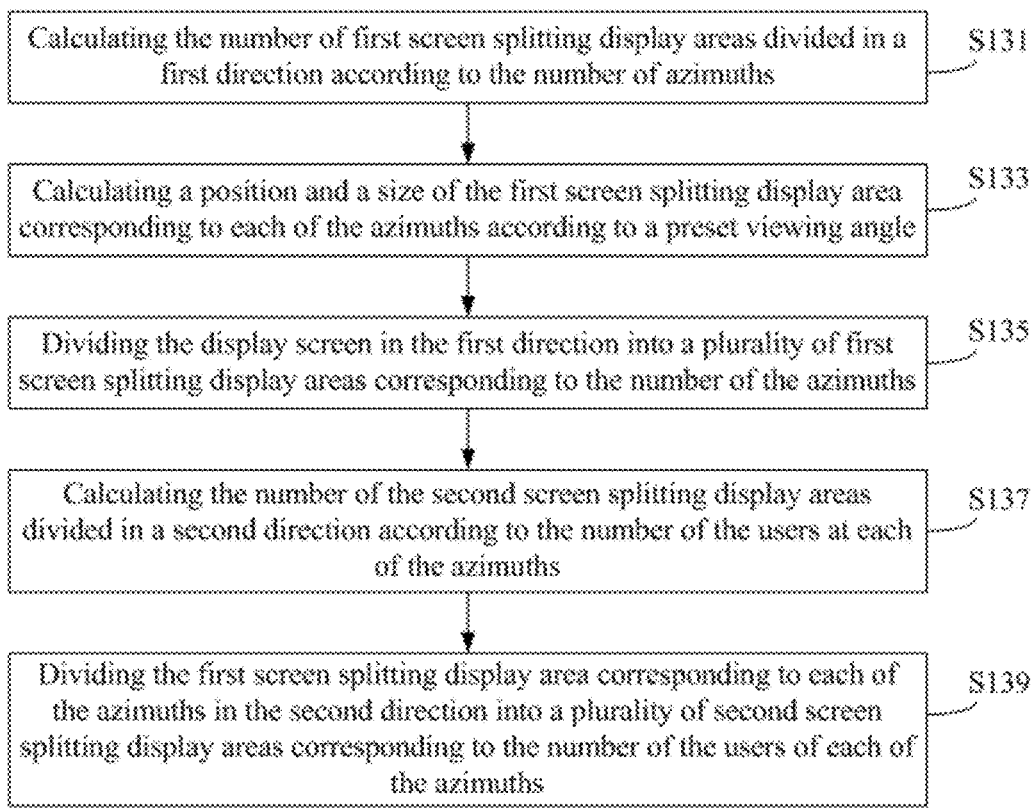
FIG. 2 is a second schematic flowchart of a method for multiuser interaction provided by a first exemplary embodiment of the present disclosure.

As illustrated in FIG. 2, the display screen of the accompanying robot is divided into a plurality of screen splitting display areas by the accompanying robot according to the number and azimuths of the users, which includes the following operations.

At block S131, the number of first screen splitting display areas divided in a first direction is calculated by the accompanying robot according to the number of the azimuths.

At block S133, a position and a size of the first screen splitting display area corresponding to each of the azimuths is calculated by the accompanying robot according to a preset viewing angle.

At block S135, the display screen in the first direction is divided into a plurality of first screen splitting display areas corresponding to the number of the azimuths.

In the embodiment, the first direction is configured as a horizontal direction. Since the display screen is arranged around the head portion or the main body of the accompanying robot, the accompanying robot is possible to interact with the users surrounding the accompanying robot by the display screen. At the same time, since the viewing angle provided by the display screen for the users located in different azimuths is limited, For example, contents displayed by the display screen located on a left side of the accompanying robot may only be viewed by the user who is also located on the left side of the accompanying robot, thus it is necessary to divide the display screen into a plurality of the first screen splitting display areas, corresponding to the number of the azimuths, in a horizontal direction surrounding the head portion or the main body of the accompanying robot, according to the number of the azimuths. The accompanying robot may interact with the users located at the different azimuths by the plurality of the first screen splitting display areas. It will be apprehended that, the number of the users at each of the azimuths may be one or more. The preset viewing angle is configured as an angle that the user of each of the azimuths clearly observes all the contents displayed in the screen splitting display area from the different viewing angles. The preset viewing angle may also be defined with ordinary meaning acknowledged and understood by person skilled in the related art.

Since the display screen is arranged around the head portion or the main body of the accompanying robot, the display screen is divided into a plurality of the first screen splitting display areas corresponding to the number of the azimuths according to the different users of the accompanying robot located at the different azimuths. Thus the accompanying robot may interact with the users located at the different azimuths by the plurality of the first screen splitting display areas. Therefore, synchronous interaction of the plurality of users may be realized without driving the accompanying robot to rotate, the power consumption and production cost of the accompanying robot may be reduced, and the overall performance of the accompanying robot may be improved.

The display screen of the accompanying robot is divided into a plurality of screen splitting display areas according to the number and azimuths of the users, further, which includes the following operations.

At block 137, the number of second screen splitting display areas divided in a second direction is calculated according to the number of the users at each of the azimuths.

At block 139, the first screen splitting display area corresponding to each of the azimuths in the second direction are divided into a plurality of second screen splitting display areas corresponding to the number of the users of each of the azimuths.

It will be apprehended that, when the number of users located in one of the azimuths of the accompanying robot is greater than one, if the accompanying robot needs to interact with each of the users independently, the first screen splitting display area corresponding to the azimuth should be further divided into a plurality of second screen splitting display areas, thus the accompanying robot may interact with the plurality of the users located at the azimuth by the plurality of the second screen splitting display areas, respectively. In the embodiment, the second direction is configures as a vertical direction. It will be apprehended that, since the size of the first screen splitting display area corresponding to each of the azimuths is set according to a condition that the user of each of the azimuths clearly observes all the contents displayed in the screen splitting display area from the different viewing angles. A radian of the display screen in the vertical direction is much smaller than the radian of the display screen in the horizontal direction, that is, all the contents displayed in the first screen splitting display area in the vertical direction may be clearly observed by all users located at the azimuth. Therefore, the first screen splitting display area corresponding to the azimuth is divided into a plurality of second screen splitting display areas corresponding to the number of the users of the azimuth. The first screen splitting display area may be equally divided into a corresponding number of the second screen splitting display areas according to the number of the users of the azimuth.

Figure 3:
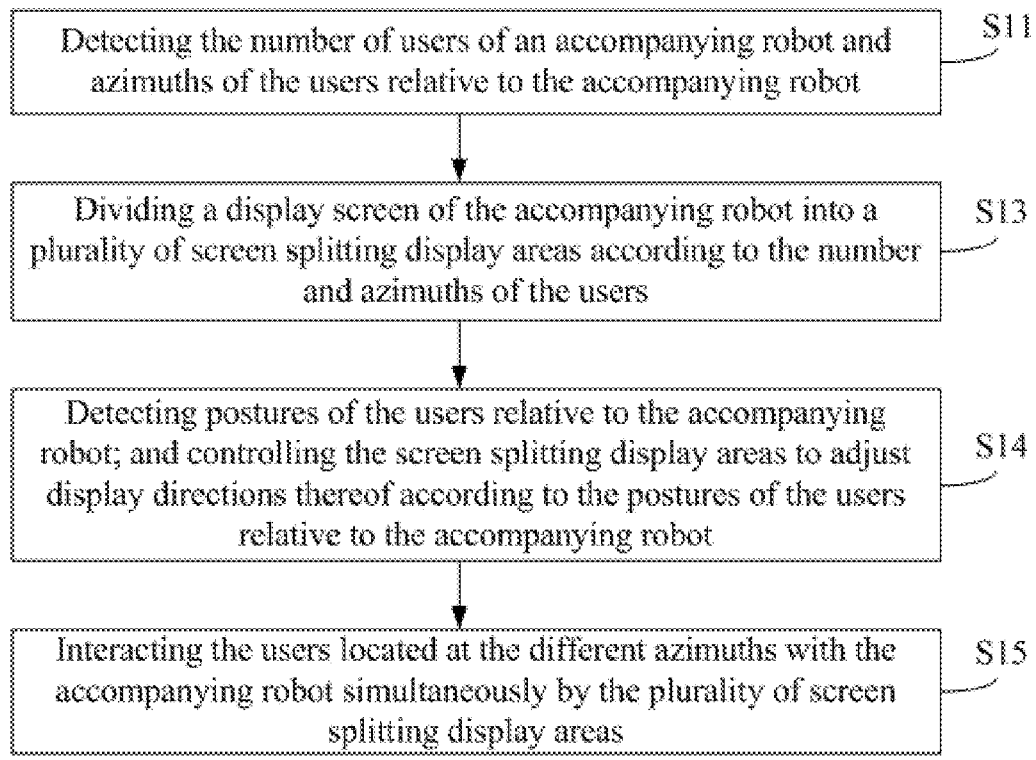
FIG. 3 is a third schematic flowchart of a method for multiuser interaction provided by a first exemplary embodiment of the present disclosure.

As illustrated in FIG. 3, in an exemplary embodiment of the present disclosure, after dividing the display screen of the accompanying robot into a plurality of the screen splitting display areas, and prior to interact with the users located at the different azimuths by the plurality of the screen splitting display areas, the method further includes the following operations.

At block S14, postures of the users relative to the accompanying robot are detected, and the screen splitting display areas are controlled to adjust display directions according to the postures of the users relative to the accompanying robot.

In the embodiment, the sensor is further configured for face recognition, and is operated to detect the posture of the user relative to the accompanying robot according to a result of the face recognition, and then the processor controls the screen splitting display area corresponding to the user to adjust display direction, to allow the display direction of the screen splitting display area to be consistent with the posture of the user relative to the accompanying robot, thus improving the user experience. The posture of the user relative to the accompanying robot may be a standing posture or a lying posture. For example, when the user lies on a bed, and the accompanying robot stands at the bedside to interact with the user, the posture of the user relative to the accompanying robot is the lying posture. At this time, the screen splitting display area corresponding to the user may be controlled to adjust the display direction to be a direction the same as the line of sight of the user, thereby improving the comfort of the user while lying down to watch the content on the screen splitting display area.

Figure 4:
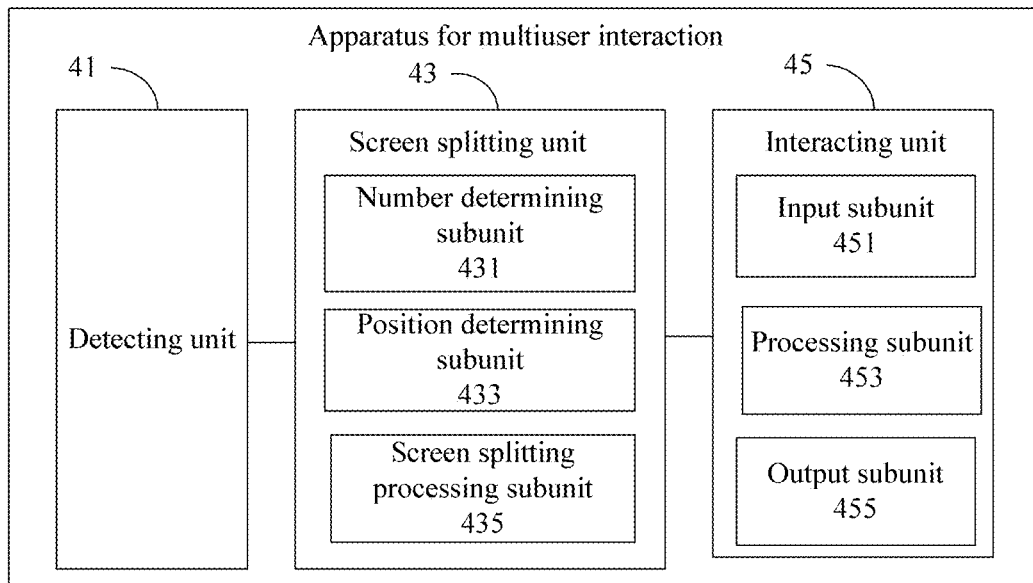
FIG. 4 is a schematic structural view of an apparatus for multiuser interaction provided by an exemplary embodiment of the present disclosure.

As illustrated in FIG. 4, in an exemplary embodiment of the present disclosure, an apparatus for multiuser interaction 40 is provided. The apparatus for multiuser interaction 40 includes a detecting unit 41 operated to detect the number of users of an accompanying robot and azimuths of the users relative to the accompanying robot, a screen splitting unit 43 operated to divide a display screen of the accompanying robot into a plurality of screen splitting display areas according to the number and azimuths of the users, and an interacting unit 45 operated to interact with the users located at the different azimuths simultaneously by the plurality of screen splitting display areas.

The screen splitting unit 43 includes a number determining subunit 431 operated to calculate the number of first screen splitting display areas divided in a first direction according to the number of the azimuths, a position determining subunit 433 operated to calculate a position and a size of the first screen splitting display area corresponding to each of the azimuths according to a preset viewing angle, and a screen splitting processing subunit 435 operated to divide the display screen in the first direction into a plurality of first screen splitting display areas corresponding to the number of the azimuths.

The number determining subunit 431 is further operated to calculate the number of second screen splitting display areas divided in a second direction according to the number of the users at each of the azimuths. The screen splitting processing subunit 435 is further operated to divide the first screen splitting display area corresponding to each of the azimuths in the second direction into a plurality of second screen splitting display areas corresponding to the number of the users of each of the azimuths.

The detecting unit 41 is further operated to detect postures of the users relative to the accompanying robot. The screen splitting unit 43 is further operated to control the screen splitting display areas to adjust display directions according to the postures of the users relative to the accompanying robot.

The interacting unit 45 includes an input subunit 451 operated to receive respectively input information of the different users by each of the screen splitting display areas, a processing subunit 453 operated to process the input information of each of the users independently, and an output subunit 455 operated to display respectively the output information for the different users by the plurality of the screen splitting display areas.

It will be apprehended that, in the embodiment, the functions of the components of the apparatus for multiuser interaction 40 and the specific implementation thereof may be referred to the related description in the embodiment illustrated in FIG. 1 to FIG. 3, and details are not described herein again.

Figure 5:
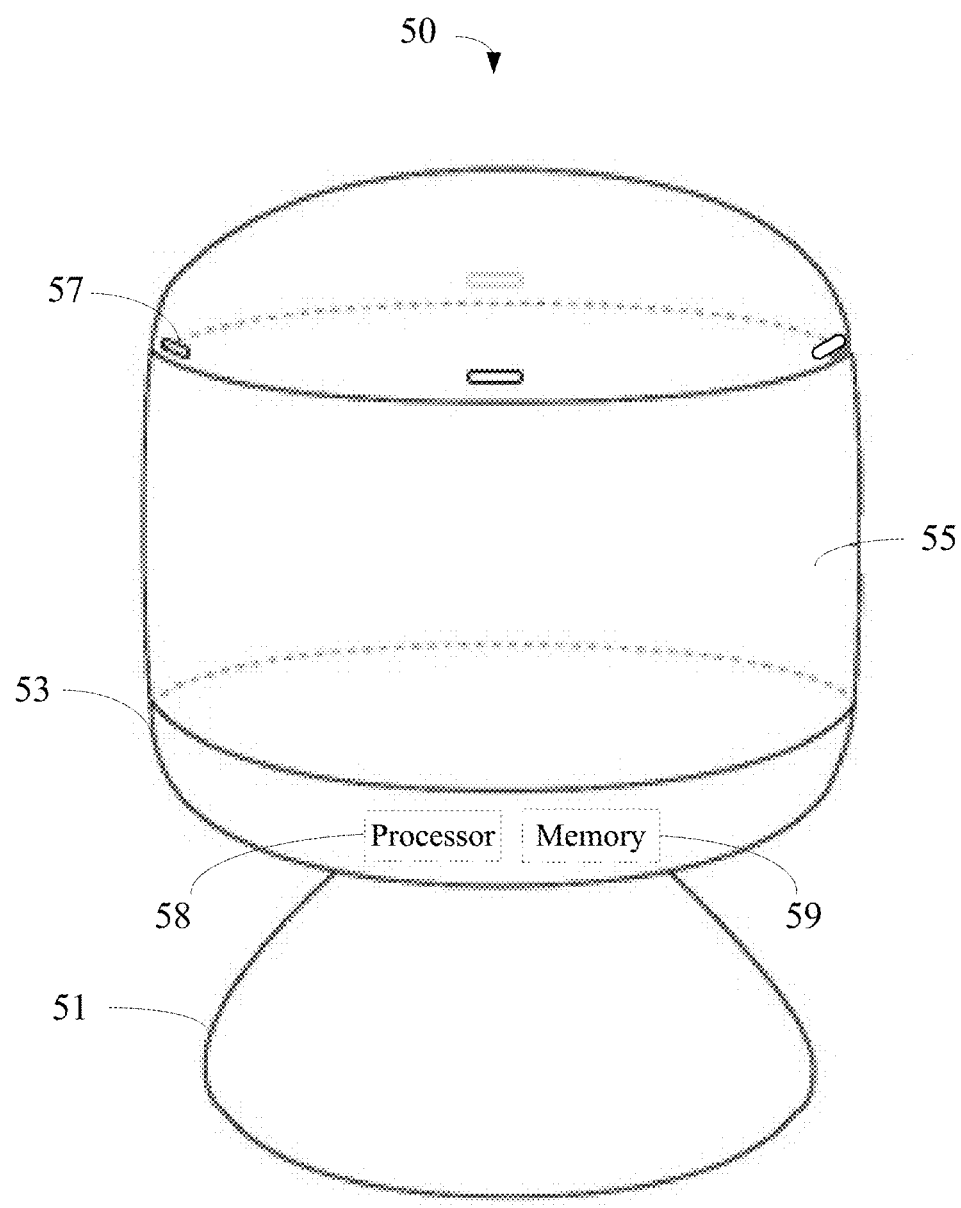
FIG. 5 is a schematic structural view of an accompanying robot provided by an exemplary embodiment of the present disclosure.

As illustrated in FIG. 5, in an exemplary embodiment of the present disclosure, an accompanying robot 50 is provided. The accompanying robot 50 includes a main body 51, a head portion 53, a display screen 55 and a plurality of sensors 57. The display screen 55 and the plurality of sensors 57 surround the main body 51 or the head portion 53. The display screen 55 is operated to interact with a user. In the embodiment, the display screen 55 is a flexible touch display screen, which can receive input information of the user and display corresponding output information. The plurality of sensors 57 are operated to detect the number of users of the accompanying robot 50 and azimuths of the users relative to the accompanying robot 50. It will be understood that, the plurality of sensors 57 can be arranged around the main body 51 or the head 53 at equal intervals according to preset azimuths and on the same horizontal plane, thus the number of users located in different azimuths of the accompanying robot 50 can be detected, and the number of users in all azimuths can be counted. In the embodiment, the sensor 57 may be an image sensor.

The accompanying robot 50 further includes a processor 58 and a memory 59. The processor 58 is electrically connected with the memory 59, the display screen 55 and the plurality of sensors 57. The processor 58 is operated to divide the display screen 55 into a plurality of split screen display areas according to the number and azimuths of the users detected by the plurality of sensors 57, process the input information of the user to generate the corresponding output information, and control the plurality of screen splitting display areas to display respectively. The memory 59 is operated to store system data and user data, such as an operating system or running program of the accompanying robot 50, or user-defined parameters. In the embodiment, the memory 59 is further operated to store an executable program code of the apparatus for multiuser interaction 40. In the embodiment, the processor 58 is operated to call the executable program code stored in the memory 59, and performed the following operations.

The number of users of an accompanying robot 50 and azimuths of the users relative to the accompanying robot 50 are detected by the plurality of sensors 57.

A display screen 55 of the accompanying robot is divided into a plurality of screen splitting display areas according to the number and azimuths of the users.

The plurality of screen splitting display areas interact with the users located at the different azimuths simultaneously.

The display screen of the accompanying robot is divided into a plurality of screen splitting display areas according to the number and azimuths of the users, which includes the following operations.

The number of first screen splitting display areas divided in a first direction is calculated according to the number of the azimuths.

A position and a size of the first screen splitting display area are calculated corresponding to each of the azimuths according to a preset viewing angle.

The display screen in the first direction is divided into a plurality of first screen splitting display areas corresponding to the number of the azimuths.

Figure 6:
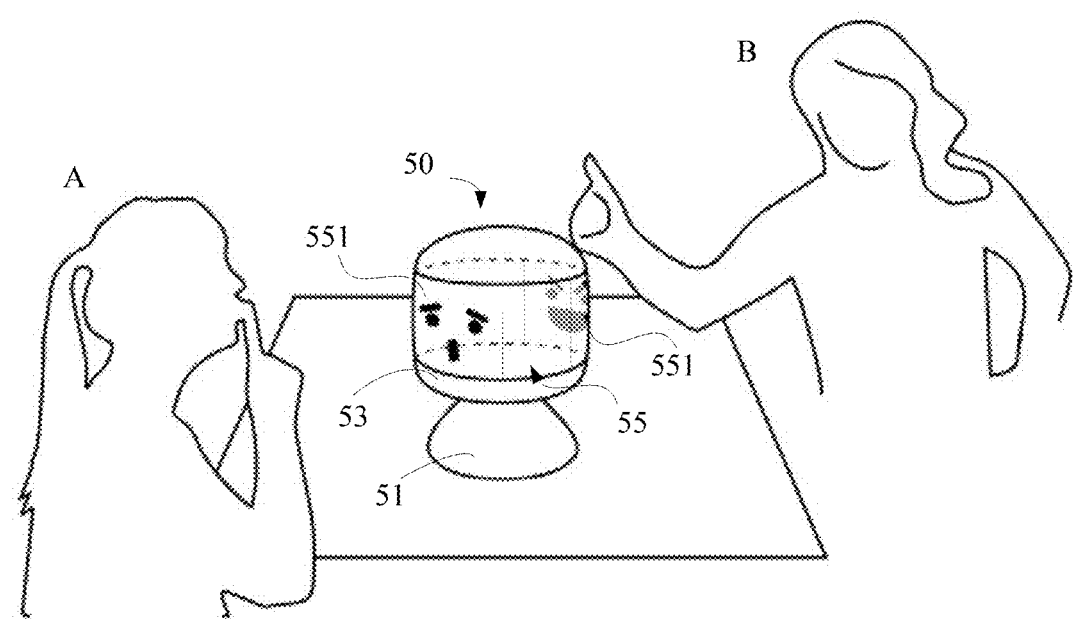
FIG. 6 is a schematic view of a first usage scenario of the accompanying robot of FIG. 5.

As illustrated in FIG. 6, in one usage scenario, a plurality of users, such as a user A and a user B, are located around the accompanying robot 50. The user A is located in a first azimuth of the accompanying robot 50, and the user B is located in a second azimuth of the accompanying robot 50. The first azimuth is opposite to the second azimuth. After detecting respectively the azimuth of the user A and the azimuth of the user B by the sensors 57, the accompanying robot 50 divides the display screen 55 into two first screen splitting display areas 551 corresponding to the first azimuth and the second azimuth. One of the first screen splitting display areas 551 is operated to interact with the user A, and the other one of the first screen splitting display areas 551 is operated to interact with the user B. The two first screen splitting display areas 551 are displayed independently from each other, that is, the contents displayed by the two first screen splitting display areas 551 may be different. Each of the azimuths corresponds to one or more users. In the embodiment, each azimuth corresponds to one user, and each of the first screen splitting display areas 551 is operated to interact with one user, thus each user can interact with the accompanying robot 50 independently. In other embodiments, each azimuth may correspond to multiple users. Each first screen slitting display area may interact with the multiple users.

Figure 7:
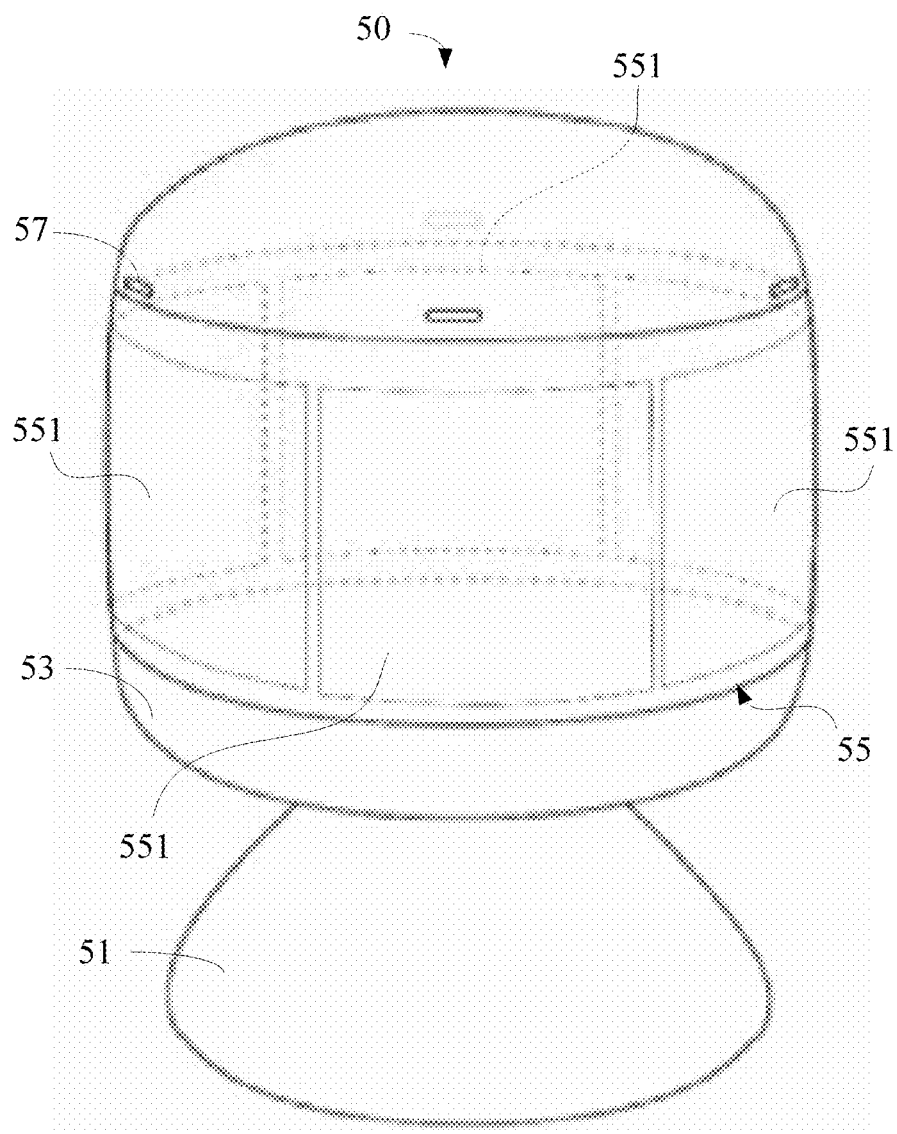
FIG. 7 is a schematic view of a second usage scenario of the accompanying robot of FIG. 5.

It will be understood that, the display screen 55 of the accompanying robot 50 is not limited to divide into two first screen splitting display areas 551 as shown in FIG. 6. The display screen 55 may be divided into a plurality of first screen splitting display areas 551 independent of one another according to the number of the azimuths. The plurality of first screen splitting display areas 551 are arranged at interval along the horizontal direction around the main body 51 or the head portion 53 of the accompanying robot 50. In the embodiment, the plurality of first split screen display areas 551 are arranged at interval along the horizontal direction around the head 53 portion of the accompanying robot 50, as shown in FIG. 7. That is, the first screen splitting display areas 551 are one-to-one correspondence with the azimuths.

The display screen of the accompanying robot is divided into a plurality of screen splitting display areas according to the number and azimuths of the users, which includes the following operations.

The number of second screen splitting display areas divided in a second direction is calculated according to the number of the users at each of the azimuths.

The first screen splitting display area corresponding to the azimuth in the second direction is divided into a plurality of second screen splitting display areas corresponding to the number of the users of the azimuth.

Figure 8:
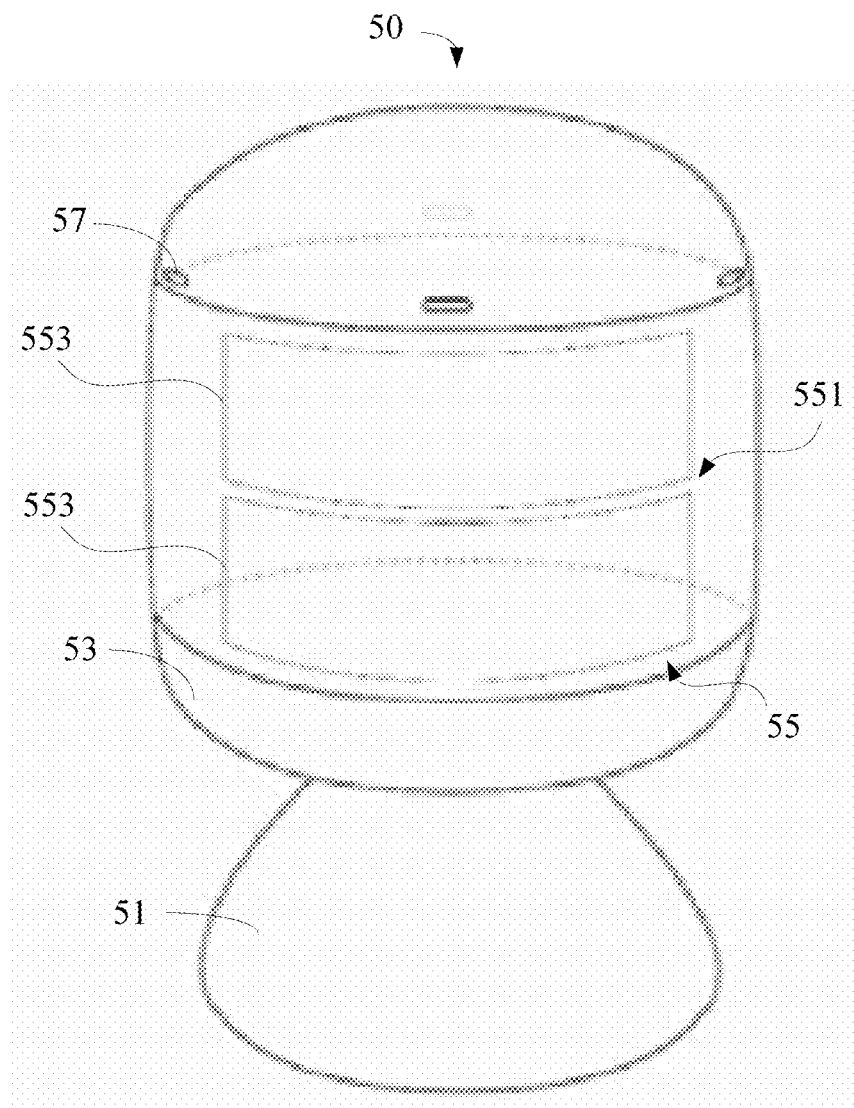
FIG. 8 is a schematic view of a third usage scenario of the accompanying robot of FIG. 5.

As illustrated in FIG. 8, in one usage scenario, when a plurality of users located at one of the azimuths of the accompanying robot 50, the first screen splitting display area 551 corresponding to the azimuth in a second direction is divided into a plurality of second screen splitting display areas 553 corresponding to the number of the users located at the azimuth. In the embodiment, the second direction is configured as a vertical direction. Two users located at one of the azimuths of the accompanying robot 50, the first screen splitting display area 551 corresponding to the azimuth in the vertical direction is divided into two second screen splitting display areas 553, thus the two second screen splitting display areas 553 can be respectively interacted with the two users located at the corresponding azimuth. The two second screen splitting display areas 553 are the same size. In the embodiment, each azimuth corresponds to a plurality of users. The second screen splitting display areas 553 are one-to-one correspondence with the users.

Before interacting the users located at the different azimuths with the accompanying robot simultaneously by the plurality of screen splitting display areas, and after the display screen of the accompanying robot is divided to the plurality of screen splitting display areas, the method further includes the following operations.

Postures of the users relative to the accompanying robot are detected by the plurality of sensor 57.

The screen splitting display areas are controlled to adjust display directions according to the postures of the users relative to the accompanying robot 50.

Figure 9:
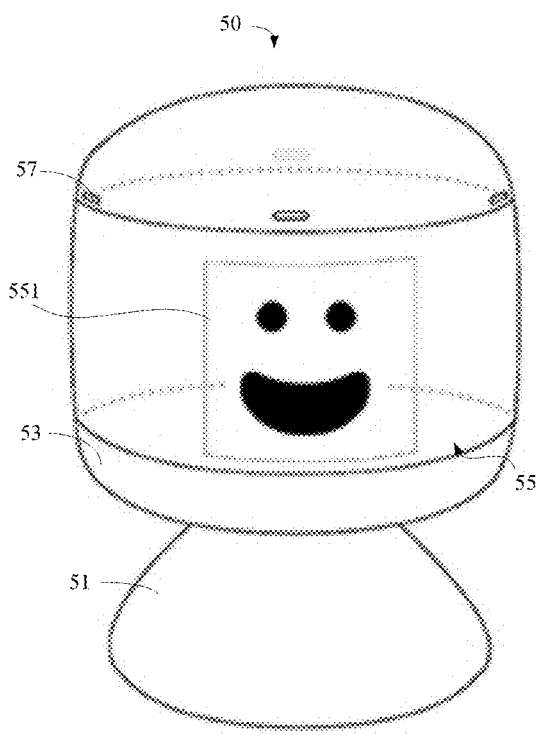
FIG. 9 is a schematic view of a fourth usage scenario of the accompanying robot of FIG. 5.
Figure 10:
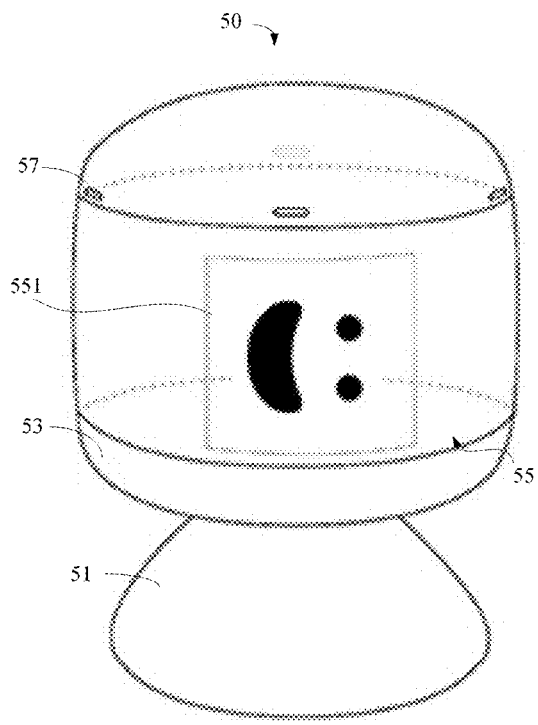
FIG. 10 is a schematic view of afifth usage scenario of the accompanying robot of FIG. 5.

As illustrated in FIG. 9 and FIG. 10, in one usage scenario, the sensor 57 is further configured for face recognition, and is operated to detect the posture of the user relative to the accompanying robot 50 according to a result of the face recognition, and then the processor 58 controls the screen splitting display area 551 corresponding to the user to adjust display direction, to allow the display direction of the screen splitting display area 551 to be consistent with the posture of the user relative to the accompanying robot 50, thus improving the user experience. The posture of the user relative to the accompanying robot 50 may be a standing posture or a lying posture. When the posture of the user relative to the accompanying robot 50 detected by the sensor 57 is the standing posture, the display direction of the screen splitting display areas 551 is shown in FIG. 9, that is, the direction of an image displayed by the screen splitting display area 551 is consistent with the line of sight of the user when the user stands up. When the posture of the user relative to the accompanying robot 50 detected by the sensor 57 is the lying posture, the processor 58 controls the screen splitting display area 551 to adjust the display direction coincidental to the line of sight of the user when the user lays down as shown in FIG. 10.

The users located at the different azimuths interact simultaneously with the plurality of screen splitting display areas, which includes the following operations.

The input information of the different users is received respectively by each of the screen splitting display areas.

The input information of each of the users is processed individually.

The input information for the different users is displayed respectively by the plurality of the screen splitting display areas.

It will be understood that, in the embodiment, the functions of the components of the accompanying robot 50 and the specific implementation thereof may be referred to the related description in the embodiment illustrated in FIG. 1 to FIG. 3, and details are not described herein again.

The method and apparatus for multiuser interaction and the accompanying robot are provided by the present disclosure, detecting the number of users of the accompanying robot and the azimuths of the users relative to the accompanying robot, dividing the display screen of the accompanying robot into a plurality of screen splitting display areas. Therefore, the accompanying robot may simultaneously interact with the plurality of users located at the different azimuths by the plurality of split screen display areas, thus realizing synchronous interaction between the accompanying robot and the plurality of users, reducing the power consumption and production cost of the accompanying robot, and improving the whole performance of the accompanying robot.

The above disclosure is only the preferred embodiment of the present disclosure. Of course, the scope of the present disclosure is not limited the disclosed embodiments, and those skilled in the art will be apprehended that all or part of the process for implementing the above embodiments, and equivalent changes made according to the claims of the present disclosure are still within the scope of the disclosure.

What is claimed is:

1. A method for multiuser interaction, comprising:
   detecting the number of users of an accompanying robot and azimuths of the users relative to the accompanying robot;
   dividing a display screen of the accompanying robot into a plurality of screen splitting display areas according to the number and azimuths of the users, comprising:
     calculating the number of first screen splitting display areas divided in a first direction according to the number of the azimuths;
     calculating a position and a size of the first screen splitting display area corresponding to each of the azimuths according to a preset viewing angle; and
     dividing the display screen in the first direction into a plurality of first screen splitting display areas corresponding to the number of the azimuths; and
   interacting the users located at the different azimuths with the accompanying robot simultaneously by the plurality of screen splitting display areas.

2. The accompanying robot of claim 1, wherein each of the plurality of screen splitting display areas corresponds to each of the users, and the number of the users at each of the azimuths is one or more.

3. The method of the claim 1, wherein the dividing the display screen of the accompanying robot into the plurality of screen splitting display areas according to the number and azimuths of the users, further comprises:
   calculating the number of second screen splitting display areas divided in a second direction according to the number of the users at each of the azimuths; and
   dividing the first screen splitting display area corresponding to each of the azimuths in the second direction into a plurality of second screen splitting display areas corresponding to the number of the users of each of the azimuths.

4. The accompanying robot of claim 3, wherein the first screen splitting display areas correspond to the azimuths, and the second screen splitting display areas correspond to the users.

5. The accompanying robot of claim 3, wherein the first direction is configured as a horizontal direction, the second direction is configured as a vertical direction, and a viewing angle of the display screen in the vertical direction is smaller than a viewing angle of the display screen in the horizontal direction.

6. The method of the claim 1, wherein after the dividing the display screen of the accompanying robot into the plurality of screen splitting display areas according to the number and azimuths of the users, and before the interacting the users located at the different azimuths with the accompanying robot simultaneously by the plurality of screen splitting display areas, the method further comprises:
   detecting postures of the users relative to the accompanying robot; and
   controlling the screen splitting display areas to adjust display directions thereof according to the postures of the users relative to the accompanying robot.

7. The accompanying robot of claim 6, wherein display directions of the screen splitting display areas are correspondingly the same as the postures of the users relative to the accompanying robot.

8. The method of the claim 1, wherein the interacting the users located at the different azimuths with the accompanying robot simultaneously by the plurality of screen splitting display areas, comprises:
   receiving respectively input information of the different users by each of the screen splitting display areas;

processing independently the input information of each of the users; and displaying respectively the input information for the different users by the plurality of the screen splitting display areas.

9. An apparatus for multiuser interaction, comprising:

a detecting unit operable to detect the number of users of an accompanying robot and azimuths of the users relative to an accompanying robot;

a screen splitting unit operable to divide a display screen of the accompanying robot into a plurality of screen splitting display areas according to the number and azimuths of the users;

wherein the screen splitting unit comprises:

a number determining subunit operable to calculate the number of first screen splitting display areas divided in a first direction according to the number of the azimuths;

a position determining subunit operable to calculate a position and a size of the first screen splitting display area corresponding to each of the azimuths according to a preset viewing angle; and a screen splitting processing subunit operable to divide the display screen in the first direction into a plurality of first screen splitting display areas corresponding to the number of the azimuths; and an interacting unit operable to interact with the users located at the different azimuths simultaneously by the plurality of screen splitting display areas.

10. The accompanying robot of claim 9, wherein each of the plurality of screen splitting display areas corresponds to each of the users, and the number of the users at each of the azimuths is one or more.

11. The apparatus of the claim 9, wherein the number determining subunit is further operable to calculate the number of second screen splitting display areas divided in a second direction according to the number of the users at each of the azimuths;

the screen splitting processing subunit is further operable to divide the first screen splitting display area corresponding to each of the azimuths in the second direction into a plurality of second screen splitting display areas corresponding to the number of the users of each of the azimuths.

12. The accompanying robot of claim 11, wherein the first direction is configured as a horizontal direction, the second direction is configured as a vertical direction, and a viewing angle of the display screen in the vertical direction is smaller than a viewing angle of the display screen in the horizontal direction.

13. The apparatus of the claim 9, wherein the detecting unit is further operable to detect postures of the users relative to the accompanying robot; and the screen splitting unit is further operable to control the screen splitting display areas to adjust display directions according to the postures of the users relative to the accompanying robot.

14. The apparatus of the claim 9, wherein the interacting unit comprises:

an input subunit operable to receive input information of the different users respectively by each of the screen splitting display areas;

a processing subunit operable to process the input information of each of the users independently; and an output subunit operable to display the input information for the different users by the plurality of the screen splitting display areas.

15. An accompanying robot, comprising: a main body and a head portion, wherein the accompanying robot further comprises a processor, a memory, a display screen, and a plurality of sensors; the display screen and the plurality of sensors surround the main body or the head portion; the processor is electrically connected with the memory, the display screen and the plurality of sensors, the processor is operable to call an executable program code stored in the memory, and perform the following operations:

detecting, by the plurality of sensors, the number of users of an accompanying robot and azimuths of the users relative to the accompanying robot;

dividing a display screen of the accompanying robot into a plurality of screen splitting display areas according to the number and azimuths of the users, comprising:

calculating the number of first screen splitting display areas divided in a first direction according to the number of the azimuths;

calculating a position and a size of the first screen splitting display area corresponding to each of the azimuths according to a preset viewing angle; and dividing the display screen in the first direction into a plurality of first screen splitting display areas corresponding to the number of the azimuths; and interacting the users located at the different azimuths with the accompanying robot simultaneously by the plurality of screen splitting display areas.

16. The accompanying robot of claim 15, wherein the plurality of sensors are arranged at equal intervals around the main body or the head portion according to a preset azimuth, and located on a same horizontal plane at the accompanying robot.

17. The accompanying robot of the claim 15, wherein the dividing the display screen of the accompanying robot into the plurality of screen splitting display areas according to the number and azimuths of the users, further comprises:

calculating the number of second screen splitting display areas divided in a second direction according to the number of the users at each of the azimuths; and dividing the first screen splitting display area corresponding to each of the azimuths in the second direction into a plurality of second screen splitting display areas corresponding to the number of the users of each of the azimuths.

18. The accompanying robot of claim 17, wherein the first direction is configured as a horizontal direction, the second direction is configured as a vertical direction, and a viewing angle of the display screen in the vertical direction is smaller than a viewing angle of the display screen in the horizontal direction.

19. The accompanying robot of claim 15, wherein after the dividing the display screen of the accompanying robot into the plurality of screen splitting display areas according to the number and azimuths of the users, and before the interacting the users located at the different azimuths with the accompanying robot simultaneously by the plurality of screen splitting display areas, the method further comprises:

detecting postures of the users relative to the accompanying robot; and controlling the screen splitting display areas to adjust display directions thereof according to the postures of the users relative to the accompanying robot.

20. The accompanying robot of claim 15, wherein the interacting the users located at the different azimuths with the accompanying robot simultaneously by the plurality of screen splitting display areas, comprises:

receiving respectively input information of the different users by each of the screen splitting display areas;

processing independently the input information of each of the users; and displaying respectively the input information for the different users by the plurality of the screen splitting display areas.

* * * * *